Aug. 26, 1952

P. R. WEAVER ET AL 2,607,998

LIMIT LOAD STRAIN INDICATOR

Filed July 6, 1950

Inventors
Preston R. Weaver and
Albert E. McPherson

By
Walter S. Paul.
Attorneys

Patented Aug. 26, 1952

2,607,998

UNITED STATES PATENT OFFICE 2,607,998

LIMIT LOAD STRAIN INDICATOR

Preston R. Weaver and Albert E. McPherson,
Montgomery County, Md.

Application July 6, 1950, Serial No. 172,372

3 Claims. (Cl. 33—147)

(Granted under the act of March 3, 1883, as
amended April 30, 1928; 370 O. G. 757)

This invention relates to a gage which may be fastened to a structural member and which will visually indicate when a predetermined loading has been equaled or exceeded.

More particularly, the invention is directed to a gage device including two portions which may be fixed at spaced points to a structural member such as any major structural component of an airplane for which the critical limit load extension is known. One of the two portions may comprise a fastening means and a calibrated plate of hardened steel which is rotatably adjustable. The companion portion includes a similar fastening means and a spring pressed extension secured thereto. The end of the extension may be set to overlap the calibrated plate an amount equal to the known critical elongation between the fixed points. When the critical strain has been equaled or exceeded, the end of the extension moves off the plate, is displaced because of its spring mounting, and thus provides a convenient visual indication which may be seen for a considerable distance.

An object is to provide a gage for structural members of aircraft and the like which will visually indicate when a known critical strain has been equaled or exceeded.

These and other objects will be manifest from a consideration of the present description, claims and drawings in which:

Figure 1:
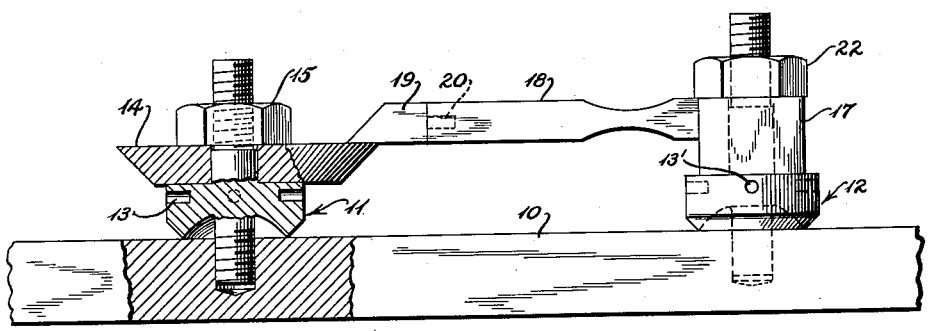
Fig. 1 shows the gage with the two portions, one partly in section, relatively positioned as they would be when fastened to a structural member.
Figure 2:
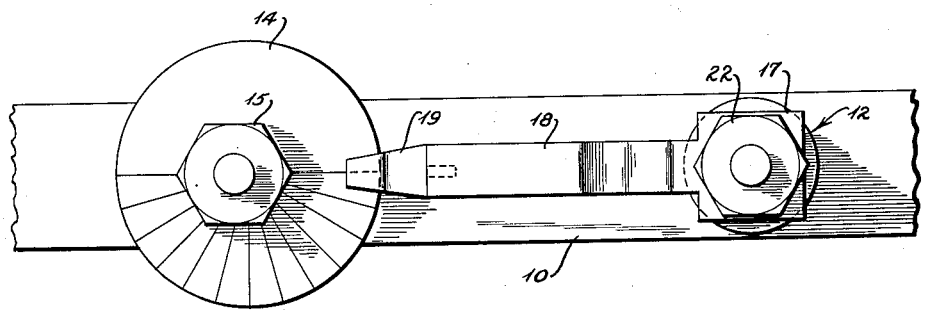
Fig. 2 is a top view of the gage of Fig. 1.

Referring to Fig. 1, a structural member 10 is shown with two threaded supports 11 and 12 in spaced relation. The supports may be screwed into the structural member as by a spanner wrench as shown or may be securely clamped in any suitable manner. Recesses for a spanner wrench are shown at 13, 13'.

The support 11 has a calibrated eccentric plate 14 secured as shown by nut 15. As will be seen, the nut may be backed off to make any desired setting. The eccentricity of the plate is to provide the predetermined overlap mentioned above. The illustrated structure provides for accurate adjustment, altho it is contemplated that a longitudinally adjustable member might be substituted for the eccentrically mounted plate, or that the plate has a polygonal type instead of a curved type knife edge.

The support 12 and nut 22 firmly secures the member 17 in position so that the projecting recessed spring portion 18 exerts a downward pressure on the hardened steel end 19 which is secured in its end 20. Both the end 19 and the plate 14 are preferably tapered to form a knife edge so as to quickly indicate excessive strain and to minimize danger of sluggish operation.

When the predetermined limit load extension of the structural member is reached the end 19 will be spring pressed below the plate edge and be observable for a considerable distance. In short, while the original setting may be made very close and accurate by the operator, the critical indication may be determined by any one with the poorest mechanical knowledge. It will be noted that the elongation of the structural member may be observed prior to reaching the critical permissible load limit.

This described embodiment shows a simple structure which is strong and reliable in operation. The improvements are not considered to be restricted to the exact structure illustrated as it is apparent that changes so as to provide for rotary motion in response to the spring action at the critical load point can be made. Also, that various forms of calibration may be used. It is desired that the scope of the invention be limited only by the scope of the appended claims and their equivalents.

The invention described herein may be manufactured and used by or for the Government of the United States of America for governmental purposes without the payment of any royalties thereon or therefor.

What is claimed is:

1. A limit strain gauge comprising a pair of spaced upright standards adapted to be fixedly mounted on a structural member, plate means mounted on one of said standards, an arm member attached at one of its ends to the other of said standards, said arm being of such construction as to span the distance between said other standard and said plate and to overlap and resiliently bear against said plate until a pre-determined strain is applied to said structural member, and means for varying the degree of overlap of said arm on said plate so as to vary the amount of strain required to cause the plate and arm to lose contact.

2. A limit strain gauge comprising a pair of spaced upright standards adapted to be fixedly mounted on a structural member, a plate mounted on one of said standards, and an arm member attached at one of its ends to the other of said standards, said arm being of such length as to span the distance between said other standard and said plate so that the other end of the arm overlaps and bears against said plate, said other arm end being resiliently held against said plate until a pre-determined strain is applied to said structural member, and means for varying the amount of overlap of said arm on said plate.

3. A limit strain gauge comprising a pair of spaced upright standards adapted to be fixedly mounted on a structural member, a plate eccentrically mounted on one of said standards, an arm member attached at one of its ends to the other of said standards, the other end of said arm resiliently bearing against said plate, said other end of the arm losing its contact with said plate upon the application of a pre-determined strain to said structural member, said plate being rotatable on said one standard so as to vary the amount of overlap of the arm end on said plate, thus changing the pre-determined strain required to cause the arm end to lose contact with the plate.

PRESTON R. WEAVER.
ALBERT E. McPHERSON.

REFERENCES CITED

The following references are of record in the file of this patent:

UNITED STATES PATENTS

| Number | Name | Date |
| --- | --- | --- |
| 285,661 | Paine | Sept. 25, 1883 |
| 2,189,775 | Bleakney | Feb. 13, 1940 |
| 2,330,959 | deForest | Oct. 5, 1943 |